United States Patent
Ikeda et al.

(10) Patent No.: US 10,641,118 B2
(45) Date of Patent: May 5, 2020

(54) SEALING APPARATUS FOR GAS TURBINE, GAS TURBINE, AND AIRCRAFT ENGINE

(71) Applicant: MITSUBISHI HEAVY INDUSTRIES, LTD., Tokyo (JP)

(72) Inventors: Kazufumi Ikeda, Tokyo (JP); Hitoshi Kitagawa, Tokyo (JP); Masato Araki, Tokyo (JP); Yoshiyuki Okabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 154 days.

(21) Appl. No.: 15/554,572

(22) PCT Filed: Dec. 22, 2015

(86) PCT No.: PCT/JP2015/085882
§ 371 (c)(1),
(2) Date: Aug. 30, 2017

(87) PCT Pub. No.: WO2016/143230
PCT Pub. Date: Sep. 15, 2016

(65) Prior Publication Data
US 2018/0073378 A1    Mar. 15, 2018

(30) Foreign Application Priority Data
Mar. 6, 2015 (JP) ................. 2015-044952

(51) Int. Cl.
*F01D 11/00* (2006.01)
*F02C 3/04* (2006.01)
(Continued)

(52) U.S. Cl.
CPC ............ *F01D 11/001* (2013.01); *F01D 25/04* (2013.01); *F16J 15/064* (2013.01); *F16J 15/08* (2013.01);
(Continued)

(58) Field of Classification Search
CPC .......... F01D 11/01; F01D 25/04; F01D 25/06; F01D 2260/96; F01D 11/001;
(Continued)

(56) References Cited

U.S. PATENT DOCUMENTS 6,217,279 B1  4/2001  Ai et al.
6,276,692 B1  8/2001  Beeck et al.
(Continued)

FOREIGN PATENT DOCUMENTS

| EP | 1 347 153 | 9/2003 |
|----|-----------|--------|
| JP | 07-301103 | 11/1995 |
| JP | 2010-077868 | 4/2010 |

OTHER PUBLICATIONS

Translation of JPH07301103.*
(Continued)

*Primary Examiner* — Steven M Sutherland
*Assistant Examiner* — Rodolphe Andre Chabreyrie
(74) *Attorney, Agent, or Firm* — Wenderoth, Lind & Ponack, L.L.P.

(57) ABSTRACT

A sealing apparatus includes a sealing portion configured to be positioned between a platform of a turbine blade and an inner shroud of a turbine vane of a turbine, and an acoustic damper having a closed space portion which is configured to communicate, via an opening, with a disc cavity configured to be positioned between the turbine blade and the turbine vane.

13 Claims, 8 Drawing Sheets

(51) Int. Cl.
  *F16J 15/54* (2006.01)
  *F16J 15/447* (2006.01)
  *F16J 15/06* (2006.01)
  *F01D 25/04* (2006.01)
  *F16J 15/08* (2006.01)

(52) U.S. Cl.
  CPC ............. *F16J 15/447* (2013.01); *F16J 15/54* (2013.01); *F02C 3/04* (2013.01); *F05D 2220/323* (2013.01); *F05D 2240/35* (2013.01)

(58) Field of Classification Search
  CPC ............ F05D 2260/96; F05D 2260/963; F16J 15/064; F16J 15/08; F16J 15/447; F16J 15/54
  See application file for complete search history.

(56) References Cited

U.S. PATENT DOCUMENTS

| | | | | |
|---|---|---|---|---|
| 2011/0220433 | A1* | 9/2011 | Nakamura | F01D 9/023 181/213 |
| 2014/0234076 | A1* | 8/2014 | Lee | F01D 11/001 415/116 |
| 2015/0003959 | A1* | 1/2015 | Duge | F02C 3/04 415/1 |
| 2016/0053623 | A1* | 2/2016 | Alvanos | F01D 11/001 415/171.1 |

OTHER PUBLICATIONS

Translation of JP2010-077868.*
Office Action dated Mar. 11, 2019 in Chinese Patent Application No. 201580077457.5, with Machine Translation.

* cited by examiner

SEALING APPARATUS FOR GAS TURBINE, GAS TURBINE, AND AIRCRAFT ENGINE

FIELD

The present invention relates to a sealing apparatus, a gas turbine, and an aircraft engine, for preventing high temperature gas from going into a turbine body from a gap between a turbine vane and a turbine blade, in, for example, a gas turbine, in which combustion is caused by supply of fuel to compressed high temperature and high pressure air, and rotary power is obtained by supply of generated combustion gas to a turbine.

BACKGROUND

A general gas turbine is formed of a compressor, a combustor, and a turbine. The compressor compresses air taken in from an air intake port to generate high temperature and high pressure compressed air. By supplying fuel to this compressed air to cause combustion, the combustor obtains high temperature and high pressure combustion gas. The turbine is driven by this combustion gas and drives a generator coaxially connected thereto.

In the turbine, a rotor is driven to rotate, by the high temperature and high pressure combustion gas generated in the combustor passing plural turbine vanes and turbine blades that are present in a combustion gas passage. A sealing apparatus, called a rim seal, is provided, in order to prevent this combustion gas from going into a turbine body from a gap between a turbine blade and a turbine vane. This rim seal prevents the entrance of the combustion gas by supplying purge air to a disc cavity formed in a gap between a turbine blade and a turbine vane, and jetting out the purge air in this disc cavity toward the gap between the turbine blade and the turbine vane. Such rim seals include, for example, a rim seal described in Japanese Unexamined Patent Application Publication No. 2010-077868.

Technical Problem

In a combustion gas passage, plural turbine vanes and turbine blades are arranged at predetermined intervals in a circumferential direction, and nonuniform pressure distribution in the circumferential direction is formed due to these plural turbine vanes and turbine blades. Then, in a high pressure region, the combustion gas goes inside the turbine from a gap between a turbine blade and a turbine vane, and in a low pressure region, purge air in the disc cavity enters the combustion gas passage from the gap between the turbine blade and the turbine vane. Thus, as described in Japanese Unexamined Patent Application Publication No. 2010-077868, even if multiple seals are arranged therein, it is difficult to sufficiently prevent the combustion gas from entering from gaps between the turbine blades and the turbine vanes. Increasing the amount of the purge air to prevent the combustion gas from entering may be considered, but this purge air is extracted from the compressor and thus the gas turbine efficiency will be reduced.

SUMMARY

The present invention solves the above described problems, and aims to provide a sealing apparatus for a gas turbine, a gas turbine, and an aircraft engine, which enable their gas turbine efficiency to be improved by enabling to reduce combustion gas entering into their turbine bodies with a small amount of purge air.

Solution to Problem

To achieve the objective described above, a sealing apparatus for a gas turbine in the present invention comprises: a sealing portion that is provided between a platform of a turbine blade and an inner shroud of a turbine vane; and an acoustic damper that has a closed space portion which communicates, via an opening, with a disc cavity provided between the turbine blade and the turbine vane.

Therefore, when the combustion gas in the combustion gas passage tries to enter into the turbine from the gap between the platform and the inner shroud, the combustion gas and its pressure wave are introduced into the closed space portion via the opening, and the acoustic energy due to this pressure wave is attenuated by resonance therein. As a result, the nonuniform pressure distribution in the circumferential direction in the combustion gas passage is turned into uniform pressure distribution in the circumferential direction by attenuation before reaching the sealing portion. The combustion gas entering into the turbine body is able to be reduced with a smaller amount of purge air than conventionally done, and the gas turbine efficiency is able to be improved.

In the sealing apparatus for a gas turbine of the present invention, the closed space portion is arranged at an inner side of the inner shroud in a radial direction.

Therefore, since the closed space portion is provided at the inner shroud, which is a stationary side, the structure is able to be simplified.

In the sealing apparatus for a gas turbine of the present invention, the sealing portion has a first sealing portion that is formed by arranging the platform more inward in the radial direction than the inner shroud with a predetermined gap from the inner shroud, and the opening is provided facing the first sealing portion in a turbine axial direction.

Therefore, by the opening of the closed space portion being provided facing the first sealing portion, the combustion gas entering into the turbine from the gap between the platform and the inner shroud is able to be appropriately introduced into the closed space portion via the opening. Thus, acoustic energy due to the pressure wave of the combustion gas is able to be appropriately attenuated in the closed space portion.

In the sealing apparatus for a gas turbine of the present invention, the sealing portion has: a first sealing portion formed by arranging the platform more inward in the radial direction than the inner shroud with a predetermined gap from the inner shroud; and a second sealing portion provided more inward in the radial direction than the first sealing portion, wherein the opening is provided at an outer side of the second sealing portion in the radial direction.

Therefore, by the opening of the closed space portion being provided at the outer side of the second sealing portion, the combustion gas entering into the turbine from the gap between the platform and the inner shroud is able to be appropriately introduced into the closed space portion via the opening before the combustion gas reaches the second sealing portion. Thus, acoustic energy due to the pressure wave of the combustion gas is able to be appropriately attenuated in the closed space portion.

In the sealing apparatus for a gas turbine of the present invention, the sealing portion has: a first sealing portion formed by arranging the platform more inward in the radial direction than the inner shroud with a predetermined gap from the inner shroud; and a second sealing portion provided more inward in the radial direction than the first sealing portion, wherein the opening is provided between the first sealing portion and the second sealing portion in the radial direction.

Therefore, by the opening of the closed space portion being provided between the first sealing portion and the second sealing portion, the combustion gas entering into the turbine from the gap between the platform and the inner shroud is appropriately introduced into the closed space portion via the opening. Thus acoustic energy due to the pressure wave of the combustion gas is able to be appropriately attenuated in the closed space portion.

In the sealing apparatus for a gas turbine of the present invention, the sealing portion has: a first sealing portion formed by arranging the platform more inward in the radial direction than the inner shroud with a predetermined gap from the inner shroud; and a second sealing portion provided more inward in the radial direction than the first sealing portion, wherein the opening has: a first opening that is provided facing the first sealing portion in a turbine axial direction; and a second opening provided at an outer side of the second sealing portion in the radial direction.

Therefore, by the first opening and the second opening of the closed space portion being provided correspondingly to the first sealing portion and the second sealing portion that are at different positions, the combustion gas going into the turbine from the gap between the platform and the inner shroud is appropriately introduced into the closed space portion via the respective openings. Thus acoustic energy due to the pressure wave of the combustion gas is able to be appropriately attenuated in the closed space portion.

In the sealing apparatus for a gas turbine of the present invention, the closed space portion has: a first closed space portion that is positioned at an outer side in the radial direction; and a second closed space portion that is positioned at an inner side in the radial direction, wherein the first opening is provided in the first closed space portion, and the second opening is provided in the second closed space portion.

Therefore, by the two closed space portion being provided correspondingly to the two openings, the pressure wave of the combustion gas introduced into the corresponding closed space portions from the respective openings is able to be appropriately attenuated.

In the sealing apparatus for a gas turbine of the present invention, the closed space portion is arranged at an inner side of the platform in the radial direction.

Therefore, since the closed space portion is provided at the platform, which is a movable side, the pressure wave of the combustion gas is able to be appropriately attenuated.

In the sealing apparatus for a gas turbine of the present invention, the sealing portion is formed by extending a sealing fin more inward in the radial direction than the inner shroud with a predetermined gap from the inner shroud, and extending the sealing fin from the platform side, the closed space portion is provided more inward in the radial direction than the sealing fin, and the opening is provided in the sealing fin.

Therefore, by providing the closed space portion and the opening by the sealing fan, complication of the structure is able to be prevented.

In the sealing apparatus for a gas turbine of the present invention, the closed space portion is provided by a front sealing plate and a rear sealing plate in an axial direction at an inner side of the platform in the radial direction, and the opening is provided in the rear sealing plate.

Therefore, by formation of the acoustic damper by utilization of the existing space portion, complication of the structure and increase in cost are able to be prevented.

In the sealing apparatus for a gas turbine of the present invention, the closed space portion is provided along a circumferential direction.

Therefore, in the circumferential direction region of the turbine blade and the turbine vane, the pressure wave of the combustion gas is able to be attenuated appropriately.

In the sealing apparatus for a gas turbine of the present invention, the closed space portion is plurally divided in the circumferential direction by a partition plate.

Therefore, by the provision of the partition plate in the closed space portion, strength thereof is able to be improved.

A gas turbine of the present invention is a gas turbine having a compressor, a combustor, and a turbine. The sealing apparatus for the gas turbine is provided in the turbine.

Therefore, by the combustion gas and its pressure wave being attenuated by the acoustic damper, the entrance of the combustion gas into the turbine body is able to be reduced with a smaller amount of purge air than conventionally done, and the gas turbine efficiency is able to be improved.

An aircraft engine of the present invention is an aircraft engine having a compressor, a combustor, and a turbine. The sealing apparatus for the gas turbine is provided in the turbine.

Therefore, by the combustion gas and its pressure wave being attenuated by the acoustic damper, the entrance of the combustion gas into the turbine body is able to be reduced with a smaller amount of purge air than conventionally done, and the gas turbine efficiency is able to be improved.

Advantageous Effects of Invention

In a sealing apparatus for a gas turbine, a gas turbine, and an aircraft engine, according to the present invention, since an acoustic damper having a closed space portion communicating, via an opening, with a disc cavity provided between a turbine blade and a turbine vane is provided, combustion gas and its circumferential direction pressure wave are attenuated by the acoustic damper. Thereby, the combustion gas is able to be prevented from going into a turbine body with a smaller amount of purge air than conventionally done, and gas turbine efficiency thereof is able to be improved.

DESCRIPTION OF EMBODIMENTS

Hereinafter, preferred embodiments of a sealing apparatus for a gas turbine, a gas turbine, and an aircraft engine, according to the present invention, will be described in detail, by reference to the appended drawings. The present invention is not limited by these embodiments, and when there are plural embodiments, the present invention, includes those formed by combination of the respective embodiments.

First Embodiment

Figure 2:
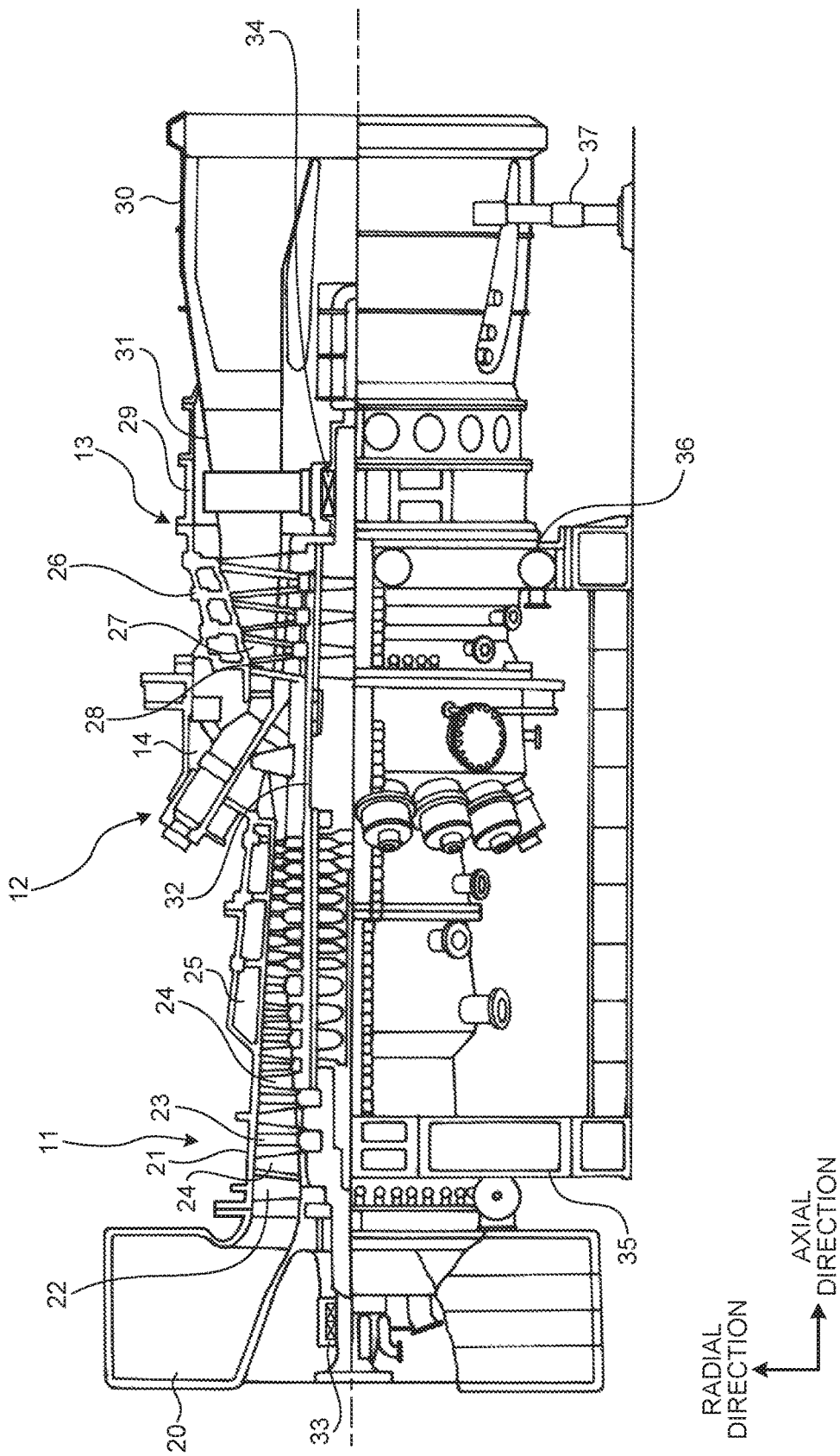
FIG. 2 is a schematic diagram illustrating an overall configuration of the gas turbine.

FIG. 2 is a schematic diagram illustrating an overall configuration of a gas turbine of a first embodiment.

The gas turbine of the first embodiment is formed of, as illustrated in FIG. 2, a compressor 11, a combustor 12, and a turbine 13. A generator not illustrated is coaxially connected to this gas turbine, and electricity is able to be generated thereby.

The compressor 11 has: an air intake port 20 through which air is taken in; an inlet guide vane (IGV) 22 arranged in a compressor casing 21; plural compressor vanes 23 and plural compressor blades 24 alternately arranged in a flowing direction of air (an axial direction of a rotor 32 described later); and a bleed air chamber 25 provided outside thereof. By compressing the air taken in from the air intake port 20, this compressor 11 generates high temperature and high pressure compressed air, which is supplied to a casing 14.

The combustor 12 is supplied with high temperature and high pressure compressed air that has been compressed by the compressor 11 and stored in the casing 14, and fuel, combusts them, and thereby generates combustion gas. The turbine 13 has plural turbine vanes 27 and plural turbine blades 28, which are alternately arranged in a flowing direction (the axial direction of the rotor 32 described later) of the combustion gas, in a turbine casing 26. An exhaust chamber 30 is arranged downstream from this turbine casing 26 via an exhaust casing 29, and the exhaust chamber 30 has an exhaust diffuser 31 connected to the turbine 13. This turbine 13 is driven by the combustion gas from the combustor 12, to drive the generator coaxially connected thereto.

The rotor (rotating shaft) 32 is arranged in the compressor 11, the combustor 12, and the turbine 13, so as to penetrate through a central portion of the exhaust chamber 30. An end portion of the rotor 32 at the compressor 11 side is freely rotatably supported by a bearing 33, and an end portion of the rotor 32 at the exhaust chamber 30 side is freely rotatably supported by a bearing 34. Plural discs, which have been installed with the respective turbine blades 24, are overlapped with one another and fixed to this rotor 32 in the compressor 11. Further, plural discs, which have been installed with the respective turbine blades 28, are overlapped with one another and fixed thereto in the turbine 13, and a driving shaft of the generator is connected to the end portion thereof at the exhaust chamber 30 side.

In this gas turbine, the compressor casing 21 of the compressor 11 is supported by a leg portion 35, the turbine casing 26 of the turbine 13 is supported by a leg portion 36, and the exhaust chamber 30 is supported by a leg portion 37.

Therefore, in the compressor 11, the air taken in from the air intake port 20 is turned into the high temperature and high pressure compressed air by passing through and being compressed in the inlet guide vane 22 and the plural compressor vanes 23 and compressor blades 24. In the combustor 12, a predetermined fuel is supplied to this compressed air and combustion is carried out. In the turbine 13, the high temperature and high pressure combustion gas generated by the combustor 12 passes through the plural turbine vanes 27 and turbine blades 28 in the turbine 13 to drive and rotate the rotor 32, and the generator connected to this rotor 32 is driven. The combustion gas is released to the atmosphere, after being decelerated through conversion of the kinetic energy into pressure by the exhaust diffuser 31 of the exhaust chamber 30.

Figure 1:
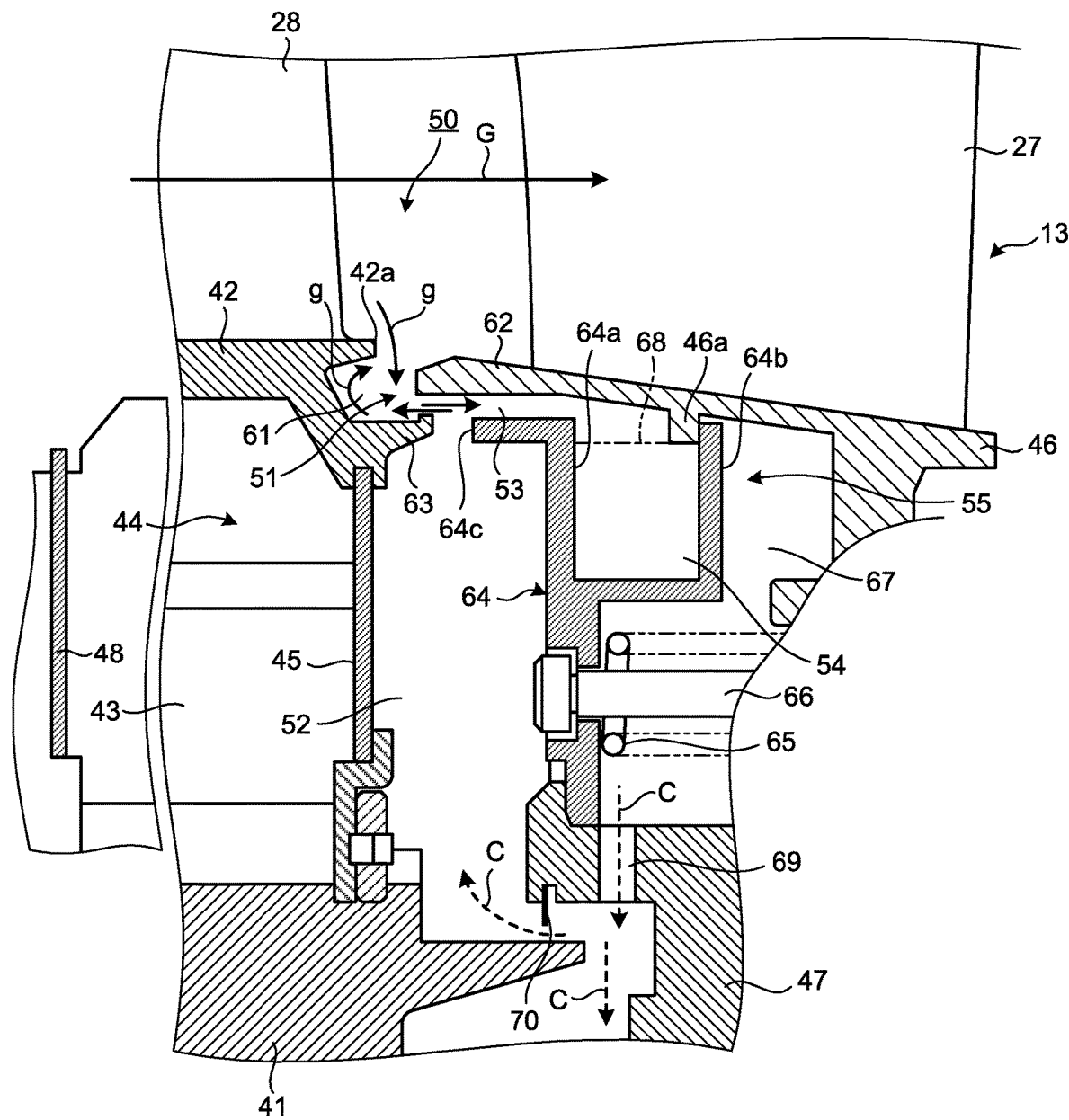
FIG. 1 is a sectional view illustrating a sealing apparatus for a gas turbine of a first embodiment.

Hereinafter, a sealing apparatus for a gas turbine of the first embodiment will be described with reference to the turbine 13 of the gas turbine configured as described above. FIG. 1 is a sectional view illustrating the sealing apparatus for the gas turbine of the first embodiment.

In the sealing apparatus for the gas turbine of the first embodiment, as illustrated in FIG. 1, plural turbine discs 41 are connected to the rotor 32 (see FIG. 2) to be integrally rotatable therewith, at predetermined intervals along the axial direction of the rotor 32. Plural turbine blades 28 are fixed to an outer peripheral portion of the turbine disc 41 at predetermined intervals in a circumferential direction thereof. That is, the turbine disc 41 is disc shaped, and has plural fitting grooves (illustration thereof being omitted) formed in the outer peripheral portion at equal intervals in the circumferential direction, the plural fitting grooves being along the axial direction. A blade portion of the turbine blade 28 is integrally provided to stand above (outside) a platform 42, and a blade root portion 43 of the turbine blade 28 fittable into the fitting groove is integrally formed below the platform 42. Therefore, the turbine blade 28 is installed in the turbine disc 41 by the blade root portion 43 being slidingly fitted into the fitting groove. Further, a space portion 44 between the respective blade root portions 43 adjacent to each other in the circumferential direction is closed by a front sealing plate 48 and a rear sealing plate 45.

The turbine vane 27 has: a proximal end portion fixed to an inner shroud 46 that is ring shaped; and a distal end portion fixed to an outer shroud (illustration thereof being omitted) that is ring shaped. The turbine vanes 27 are arranged between the respective turbine blades 28 in the axial direction, are supported between the inner shrouds 46 and the outer shrouds that mutually form a cylindrical shape, and are fixed at predetermined intervals in the circumferential direction. The outer shroud is supported in the turbine casing 26 via a vane ring (illustration thereof being omitted). A sealing ring retaining ring 47 is fixed inside the inner shroud 46. The sealing ring retaining ring 47 has a seal (illustration thereof being omitted) provided facing a rim portion of the turbine disc 41 positioned inside the sealing ring retaining ring 47.

A sealing apparatus 50 of this embodiment includes: a first sealing portion 51 provided between the platform 42 of the turbine blade 28 and the inner shroud 46 of the turbine vane 27; and an acoustic damper 55 having a closed space portion 54 communicating with, via an opening 53, a disc cavity 52 provided between the turbine blade 28 and the turbine vane 27. In this case, the first sealing portion 51 and the closed space portion 54 are continuous in the circumferential direction.

The sealing apparatus 50 reduces high temperature gas (combustion gas) G entering into the disc cavity 52 formed between the turbine blade 28 and the turbine vane 27. The high temperature gas G flows in the axial direction through a gas passage in which the turbine blade 28 and the turbine vane 27 are arranged. The sealing apparatus 50 reduces high temperature gas g entering near the blade root portion 43 of the turbine blade 28 and around the rotor 32 by the high temperature gas g being rolled in toward the disc cavity 52, the high temperature gas g being a part of the high temperature gas G diverted from the high temperature gas G.

The turbine blade 28 is provided with a first buffer cavity 61, the first buffer cavity 61 is provided downstream side of the platform 42 in a flowing direction of the high temperature gas G. This first buffer cavity 61 is a recessed portion formed facing, in the flowing direction of the high temperature gas G, to a turbine vane rim 62 in the inner shroud 46 of the turbine vane 27.

The first buffer cavity 61 is provided between a downstream end portion 42a of the platform 42 facing the gas passage, and a first sealing fin 63 protruding toward the disc cavity 52 from this platform 42 at an inner side in radial direction thereof. Therefore, the first buffer cavity 61 has a shape that equalizes, in the circumferential direction, the flow of the high temperature gas g in an entry pathway, through which the high temperature gas g diverted from the flow of the high temperature gas G reaches the disc cavity 52.

The first sealing portion 51 increases, by narrowing the flow channel sectional area, flow channel resistance of the high temperature gas g going inward in a radial direction, that is, toward the disc cavity 52. The first sealing portion 51 is formed by the first sealing fin 63 and the turbine vane rim 62 in the flowing direction of the high temperature gas g. This first sealing fin 63 extends downstream in the flowing direction of the high temperature gas G from an inner side in the radial direction of the first buffer cavity 61 in the platform 42, and a distal end portion of the first sealing fin 63 is bent and protruded outward in the radial direction. This first sealing fin 63 is arranged so as to overlap the turbine vane rim 62 with a predetermined gap therefrom in the radial direction, the turbine vane rim 62 extends upstream in the flowing direction of the high temperature gas G from the inner shroud 46.

The acoustic damper 55 is arranged at an inner side of the inner shroud 46 of the turbine vane 27 in the radial direction. The sealing ring retaining ring 47 is fixed inside the inner shroud 46, and a buffer plate 64 is arranged at an upstream side in the flowing direction of the high temperature gas G in the inner shroud 46 and the sealing ring retaining ring 47. This buffer plate 64 is supported by a coil spring 65 and a support shaft 66, and forms an in-vane flow channel 67 by being closely contacted with the sealing ring retaining ring 47 through biasing force.

The buffer plate 64 has a plate main body 64a and a partition portion 64b that has an L-shaped cross sectional shape. The plate main body 64a has: a lower end portion closely contacting the sealing ring retaining ring 47; an upper end portion extending to an inner surface of the turbine vane rim 62 (inner shroud 46); and a distal end portion bending and extending upstream in the flowing direction of the high temperature gas G to form a fin 64c. Therefore, the opening 53 is formed by the inner surface of the turbine vane rim 62 and an outer surface of the fin 64c being arranged to overlap each other with a predetermined gap therebetween in the radial direction.

Further, the closed space portion 54 is formed by an upper end portion of the partition portion 64b of the buffer plate 64 closely contacting a projection 46a protruding inward from the inner surface of the inner shroud 46. This closed space portion 54 communicates with the disc cavity 52 via the opening 53. In this case, the opening 53 is provided facing the first sealing portion 51 in the flowing direction (turbine axial direction) of the high temperature gas G.

This closed space portion 54 is formed by the inner shroud 46 and the buffer plate 64, and is provided continuously along the circumferential direction. The closed space portion 54 does not need to be provided continuously along the circumferential direction. For example, the closed space portion 54 may be plurally divided in the circumferential direction by providing partition plates 68 at predetermined intervals in the circumferential direction in the closed space portion 54. Further, plural closed space portions may be provided intermittently in the circumferential direction. Furthermore, the opening 53 may be continuous in the circumferential direction, or may be provided at predetermined intervals. In this case, the opening 53 is preferably provided at least at a position opposite to the first sealing portion 51 in the axial direction (flowing direction of the high temperature gas G).

This acoustic damper 55 attenuates pressure wave by introducing the high temperature gas g and the pressure wave from the opening 53 into the closed space portion 54 in the entry pathway, through which the high temperature gas g diverted from the flow of the high temperature gas G reaches the disc cavity 52. A length and an amount of gap of the opening 53, and a shape and a volume of the closed space portion 54 are set in advance, according to a wave number of a circumferential direction pressure distribution of the high temperature gas g.

Further, the sealing apparatus 50 configured as described above introduces compressed air as a sealing fluid into the disc cavity 52 through an in-vane flow channel (illustration thereof being omitted) formed in the turbine vane 27. Cooling air (compressed air) C extracted from the compressor 11 (see FIG. 2) is introduced into the in-vane flow channel 67 through the inside of the turbine vane 27, and is jetted out from a sealing air supply hole 69. This cooling air is used as sealing air of the above described seal. After this cooling air C is jetted out from the sealing air supply hole 69, a part of the cooling air C is diverted from the cooling air C, passes a gap in a seal 70, flows into the disc cavity 52, and serves as purge air. Therefore, by introduction of this cooling air C therein, the disc cavity 52 is maintained at a predetermined pressure and cooled down.

Functions of the sealing apparatus 50 of this embodiment will now be described.

The high temperature gas G flows through the gas passage, in which the turbine blade 28 and the turbine vane 27 are arranged, and the high temperature gas g, which is a part of the high temperature gas C, is diverted from the high temperature gas G and is rolled in toward the disc cavity 52. Besides, the cooling air C is introduced into the in-vane flow channel 67 through the turbine vane 27 and is jetted out from the sealing air supply hole 69, and thereafter, a part of the cooling air C flows into the disc cavity 52 through the gap in the seal 70. Therefore, by introduction of this cooling air C therein, the disc cavity 52 is maintained at the predetermined pressure, and inflow of the high temperature gas g into the disc cavity 52 is reduced.

However, since the plural turbine vanes 27 are arranged at predetermined intervals in the circumferential direction in the gas passage, nonuniform pressure distribution in the circumferential direction is formed upstream of the respective turbine vanes 27. In a high pressure region, there is a risk that the high temperature gas g may go into the disc cavity 52 from the gap between the turbine blade 28 and the turbine vane 27.

The sealing apparatus 50 reduces the high temperature gas g entering into the disc cavity 52 from the gap between the turbine blade 28 and the turbine vane 27. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g tries to enter the disc cavity 52 through the first sealing portion 51. Since the opening 53 of the acoustic damper 55 faces the first sealing portion 51, a part of the high temperature gas g that has passed the first sealing portion 51 is introduced into the closed space portion 54 through the opening 53. When the high temperature gas g and its pressure wave are introduced into the closed space portion 54, acoustic energy due to the pressure wave of the high temperature gas g is attenuated by resonance in this closed space portion 54. As a result, the pressure distribution in the circumferential direction is mitigated further, and the amount of the high temperature gas g passing the first sealing portion 51 and entering into the disc cavity 52 is reduced.

As described above, in the sealing apparatus for the gas turbine of the first embodiment, the first sealing portion 51, which is provided between the platform 42 of the turbine blade 28 and the inner shroud 46 of the turbine vane 27 of the turbine 13, and the acoustic damper 55 which has the closed space portion 54 communicating, via the opening 53, with the disc cavity 52 between the turbine blade 28 and the turbine vane 27, are provided.

Therefore, when the combustion gas G in the gas passage tries to enter the disc cavity 52 from the gap between the platform 42 and the inner shroud 46, the combustion gas P and its pressure wave are introduced into the closed space portion 54 via the opening 53, and the acoustic energy due to this pressure wave is attenuated by resonating therein. As a result, the circumferential direction pressure distribution at the first sealing portion 51 is equalized, the combustion gas G entering into the disc cavity 52 is reduced by a smaller amount of purge air than conventionally done, and thereby, the gas turbine efficiency is able to be improved. That is, the amount of compressed air extracted from the compressor 11 is able to be reduced.

In the sealing apparatus for the gas turbine of the first embodiment, the closed space portion 54 arranged at the inner side of the inner shroud 46 in the radial direction. Therefore, since the closed space portion 54 is provided at the inner shroud 46 that is at a stationary side, by effective utilization of the space portion, the structure is able to be simplified.

In the sealing apparatus for the gas turbine of the first embodiment, the first sealing portion 51 is provided by arranging the platform 42 more inward in the radial direction than the inner shroud 46 with a predetermined gap therefrom, and the opening 53 is provided opposite to the first sealing portion 51 in the axial direction of the rotor 32. Therefore, the combustion gas G going into the disc cavity 52 from the gap between the platform 42 and the inner shroud 46 is able to be appropriately introduced into the closed space portion 54 via the opening 53, and the acoustic energy due to the pressure wave of the combustion gas P is able to be appropriately attenuated in the closed space portion 54.

In the sealing apparatus for the gas turbine of the first embodiment, the closed space portion 54 is provided along the circumferential direction. Therefore, in a circumferential direction region of the turbine blade 28 and the turbine vane 27, the pressure wave of the combustion gas P is able to be attenuated appropriately.

In the sealing apparatus for the gas turbine of the first embodiment, the closed space portion 54 is plurally divided in the circumferential direction by the partition plates 68.

Therefore, by providing a single partition plate or plural partition plates in the closed space portion 54, strength of the buffer plate 64 is able to be improved.

Further, in the gas turbine of the first embodiment, the gas turbine having the compressor 11, the combustor 12, and the turbine 13, the sealing apparatus 50 is provided in the turbine 13. Therefore, by the combustion gas G and its pressure wave being attenuated by the acoustic damper 55, the combustion gas G entering into the turbine body is able to be reduced with a smaller amount of purge air than conventionally done, and the efficiency of the gas turbine is able to be improved.

Second Embodiment

Figure 3:
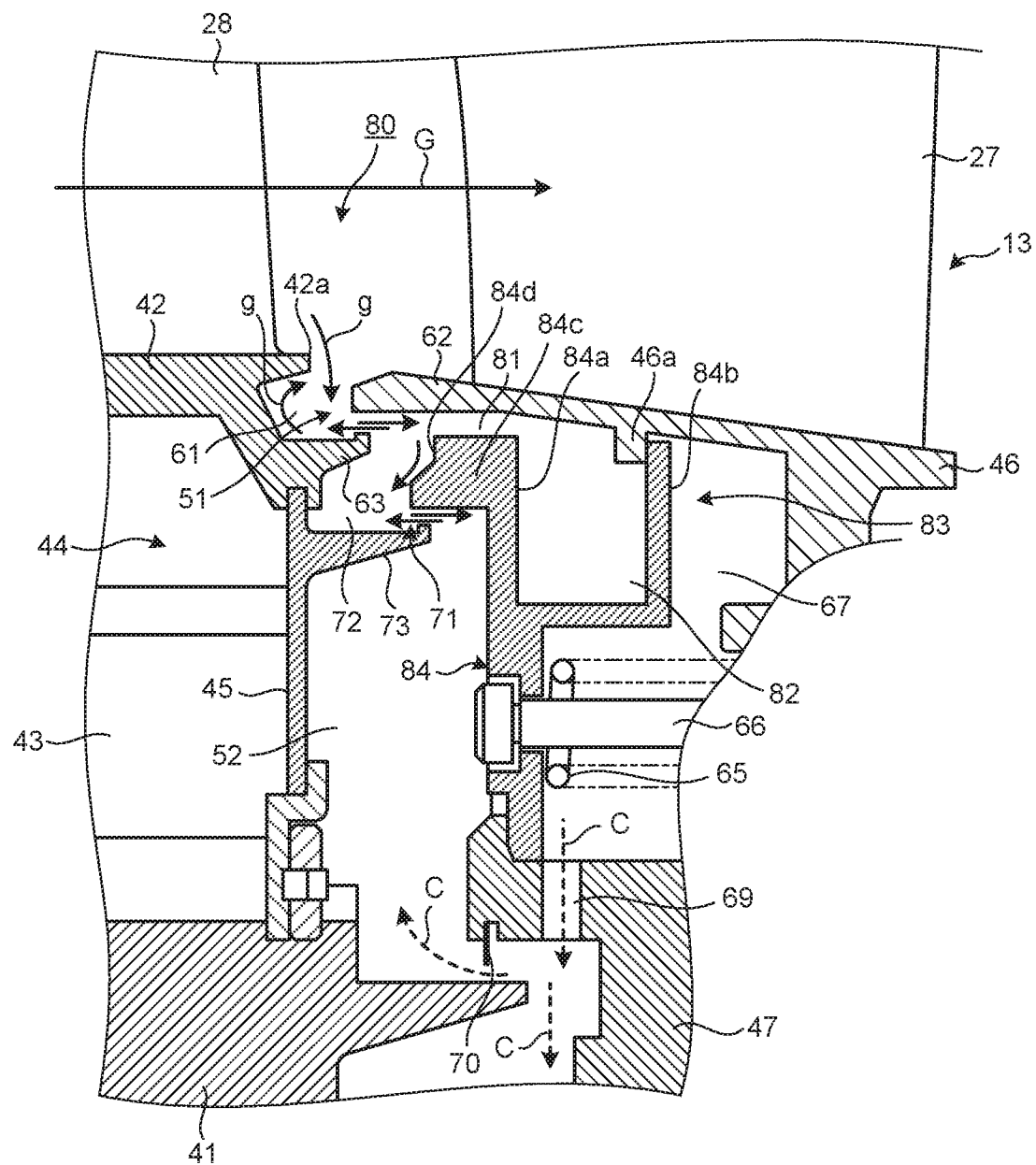
FIG. 3 is a sectional view illustrating a sealing apparatus for a gas turbine of a second embodiment.

FIG. 3 is a sectional view illustrating a sealing apparatus for a gas turbine of a second embodiment. The same signs will be appended to parts having functions that are the same as those of the above described embodiment, and detailed description thereof will be omitted.

In the second embodiment, as illustrated in FIG. 3, a sealing apparatus 80 includes: the first sealing portion 51 which is provided between the platform 42 of the turbine blade 28 and the inner shroud 46 of the turbine vane 27; a second sealing portion 71 which is provided more inward in the radial direction than the first sealing portion 51; and an acoustic damper 83 which has a closed space portion 82 that communicates, via an opening 61, with the disc cavity 52 provided between the turbine blade 28 and the turbine vane 27.

The turbine blade 28 is provided with the first buffer cavity 61, the first buffer cavity 61 is provided downstream side of the platform 42 in the flowing direction of the high temperature gas G. This first buffer cavity 61 is a recessed portion formed opposite, in the flowing direction of the high temperature gas G, to the turbine vane rim 62 in the inner shroud 46 of the turbine vane 27. The first buffer cavity 61 is formed by the first sealing fin 63 and the turbine vane rim 62.

The turbine blade 28 is provided with a second buffer cavity 72 at an inner peripheral side of the first sealing fin 63. This second buffer cavity 72 is a space portion surrounded by an inner peripheral surface of the first sealing fin 63 and an outer peripheral surface of the second sealing fin 73. The second buffer cavity 72 is positioned downstream from the first buffer cavity 61 in an entry pathway, through which the high temperature gas g reaches the disc cavity 52.

The acoustic damper 83 is arranged at an inner side of the inner shroud 46 of the turbine vane 27 in the radial direction. The sealing ring retaining ring 47 is fixed inside the inner shroud 46, and a buffer plate 84 is arranged at an upstream side in the flowing direction of the high temperature gas G in the inner shroud 46 and the sealing ring retaining ring 47. This buffer plate 84 is supported by the coil spring 65 and the support shaft 66, and forms the in-vane flow channel 67 by being closely contacted with the sealing ring retaining ring 47 through biasing force.

The buffer plate 84 has a plate main body 84a and a partition portion 84b having an L-shaped cross sectional shape. The plate main body 84a has: a lower end portion closely contacting the sealing ring retaining ring 47; an upper end portion extending to an inner surface of the turbine vane rim 62 (inner shroud 46); and a distal end portion bending and extending upstream in the flowing direction of the high temperature gas G to form a fin 84c. Therefore, an opening 81 is formed by the inner surface of the turbine vane rim 62 and an outer surface of the fin 84c overlapping each other with a predetermined gap therebetween in the radial direction.

Further, the closed space portion 82 is formed by an upper end portion of the partition portion 84b of the buffer plate 84 closely contacting the projection 46a protruding inward from the inner surface of the inner shroud 46. This closed space portion 82 communicates with the disc cavity 52 via the opening 81. In this case, the opening 81 is provided facing the first sealing portion 51 in the flowing direction (turbine axial direction) of the high temperature gas G. This closed space portion 82 is formed by the inner shroud 46 and the buffer plate 84, and is provided continuously along the circumferential direction.

The second sealing portion 71 increases, by narrowing the flow channel sectional area, flow channel resistance of the high temperature gas g going inward in the radial direction, that is, toward the disc cavity 52. The second sealing portion 71 is formed by the second sealing fin 73 and the buffer plate 84 in the flowing direction of the high temperature gas g. This second sealing fin 73 extends downstream in the flowing direction of the high temperature gas G from an inner side of the first sealing fin 63 in the rear sealing plate 45 in the radial direction, and a distal end portion of the second sealing fin 73 is bent and protruded outward in the radial direction. The second sealing fin 73 is arranged so as to overlap the fin 84c with a predetermined gap therefrom in the radial direction, the fin 84c extends upstream in the flowing direction of the high temperature gas G from the buffer plate 84.

The buffer plate 84 has a curved guide surface 84d formed on an end surface of the fin 84c which is recessed, and the buffer plate 84 guides the high temperature gas g toward the second sealing fin 73. Therefore, the second buffer cavity 72 is a space portion surrounded by the inner peripheral surface of the first sealing fin 63, the outer peripheral surface of the second sealing fin 73, and the curved guide surface 84d of the buffer plate 84. The opening 81 of the acoustic damper 83 is provided outside the second sealing portion 71 in the radial direction.

A part of the high temperature gas G is diverted therefrom and rolled in toward the disc cavity 52. As that happens, the sealing apparatus 80 reduces the high temperature gas g entering into the disc cavity 52. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g tries to enter the disc cavity 52 through the first sealing portion 51. Since the opening 81 of the acoustic damper 83 faces the first sealing portion 51, a part of the high temperature gas g that has passed the first sealing portion 51 is introduced into the closed space portion 82 through the opening 81. When the high temperature gas g and its pressure wave are introduced into the closed space portion 82, acoustic energy due to the pressure wave of the high temperature gas g is attenuated by resonance in this closed space portion 82, and the pressure distribution thereof in the circumferential direction is mitigated further.

Further, the high temperature gas g that has not been introduced into the closed space portion 82 flows into the second buffer cavity 72 and is agitated mixed therein, and thereby, the pressure distribution thereof in the circumferential direction is mitigated even further. The high temperature gas g entering into the disc cavity 52 is reduced by the second sealing portion 71.

As described above, in the sealing apparatus for the gas turbine of the second embodiment, the first sealing portion 51, which is provided between the platform 42 of the turbine blade 28 and the inner shroud 46 of the turbine vane 27, the second sealing portion 71, which is provided more inward in the radial direction than the first sealing portion 51, and the acoustic damper 83, which has the closed space portion 82 that communicates, via the opening 81, with the disc cavity 52 provided between the turbine blade 28 and the turbine vane 27, are provided. The opening 81 is provided outside the second sealing portion 71 in the radial direction.

Therefore, by providing the opening 81 of the closed space portion 82 outside the second sealing portion 71, the combustion gas G going into the disc cavity 52 from the gap between the platform 42 and the inner shroud 46 is able to be introduced into the closed space portion 82 via the opening 81 before the combustion gas G reaches the second sealing portion 71. Thus, the acoustic energy due to the pressure wave of the combustion gas G able to be appropriately attenuated in the closed space portion 82.

Third Embodiment

Figure 4:
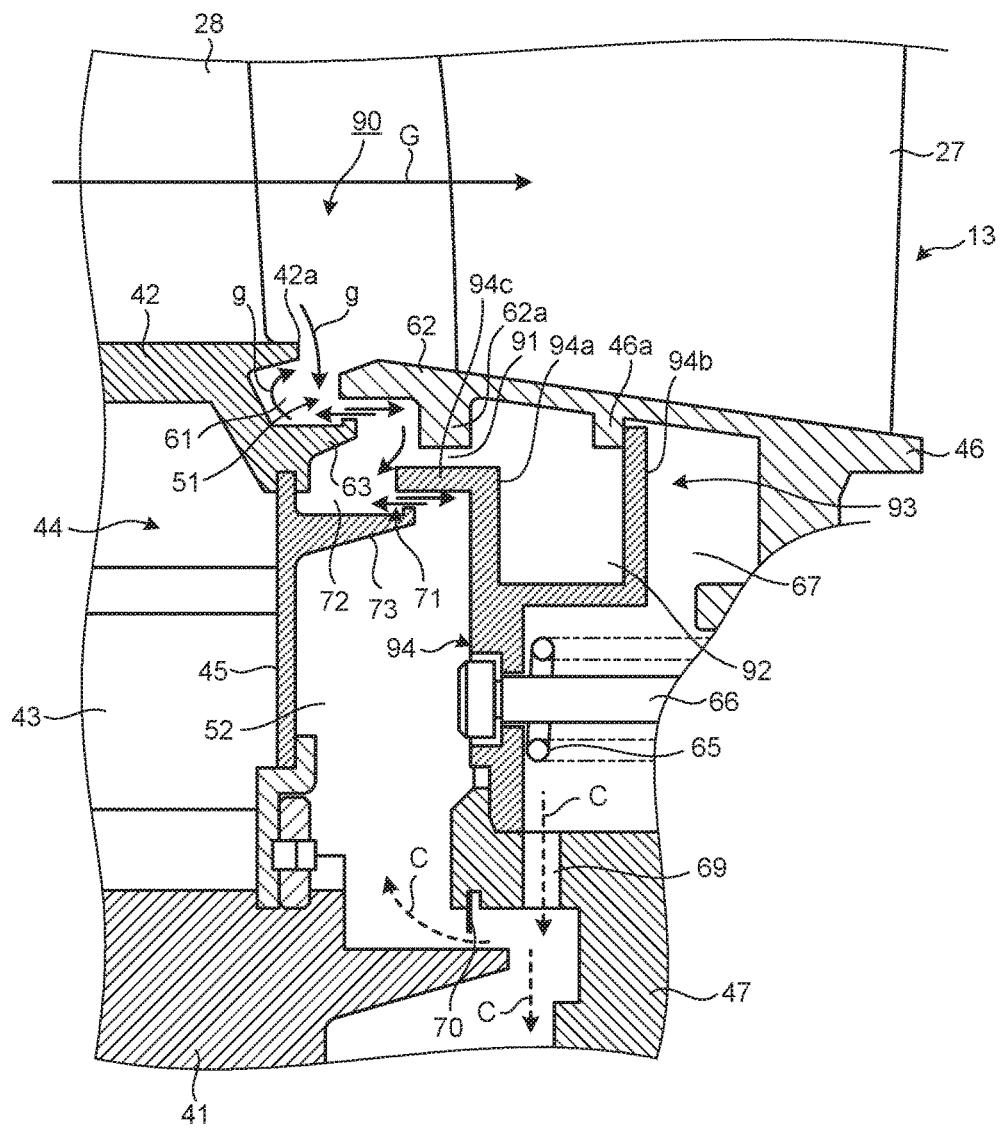
FIG. 4 is a sectional view illustrating a sealing apparatus for a gas turbine of a third embodiment.

FIG. 4 is a sectional view illustrating a sealing apparatus for a gas turbine of a third embodiment. The same signs will be appended to parts having functions that are the same as those of the above described embodiments, and detailed description thereof will be omitted.

In the third embodiment, as illustrated in FIG. 4, a sealing apparatus 90 includes: the first sealing portion 51 which is provided between the platform 42 of the turbine blade 28 and the inner shroud 46 of the turbine vane 27; the second sealing portion 71 which is provided more inward in the radial direction than the first sealing portion 51; and an acoustic damper 93 which has a closed space portion 92 that communicates, via an opening 91, with the disc cavity 52 provided between the turbine blade 28 and the turbine vane 27.

The acoustic damper 93 is arranged at an inner side of the inner shroud 46 of the turbine vane 27 in the radial direction. The sealing ring retaining ring 47 is fixed inside the inner shroud 46, and a buffer plate 94 is arranged at an upstream side in the flowing direction of the high temperature as G in the inner shroud 46 and the sealing ring retaining ring 47. This buffer plate 94 is supported by the coil spring 65 and the support shaft 66, and forms the in-vane flow channel 67 by being closely contacted with the sealing ring retaining ring 47 through biasing force.

A protrusion 62a protruding inward from the inner surface of the turbine vane rim 62 is provided in the inner shroud 46. The buffer plate 94 has a plate main body 94a and a partition portion 94b having an L-shaped cross sectional shape. The plate main body 94a has: a lower end portion closely contacting the sealing ring retaining ring 47; an upper end portion extending to the inner surface of the protrusion 62a of the turbine vane rim 62; and a distal end portion bending and extending upstream in the flowing direction of the high temperature gas G to form a fin 94c. Therefore, the opening 91 is formed by the inner surface of the protrusion 62a of the turbine vane rim 62 and an outer surface of the fin 94c being arranged to overlap each other with a predetermined gap therebetween in the radial direction.

Further, in the buffer plate 94, the closed space portion 92 is formed by an upper end portion of the partition portion 94b closely contacting the projection 46a protruding inward from the inner surface of the inner shroud 46. This closed space portion 92 communicates with the disc cavity 52 via the opening 91. In this case, the opening 91 is provided between the first sealing portion 51 and the second sealing portion 71 in the radial direction. This closed space portion 92 is formed by the inner shroud 46 and the buffer plate 94, and is provided continuously along the circumferential direction.

A part of the high temperature gas G is diverted therefrom and rolled in toward the disc cavity 52. As this happens, the sealing apparatus 90 reduces the high temperature gas g entering into the disc cavity 52. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g flows into the second buffer cavity 72 through the first sealing portion 51, is agitated and mixed therein, and thereby, the pressure distribution in the circumferential direction is mitigated further. The high temperature gas g then tries to enter the disc cavity 52 through the second sealing portion 71. Since the opening 91 of the acoustic damper 93 is positioned more outward in the radial direction than the second sealing portion 71, a part of the high temperature gas g that has passed the first sealing portion 51 is introduced into the closed space portion 92 through the opening 91. When the high temperature gas g and its pressure wave are introduced into the closed space portion 92, acoustic energy due to this pressure wave of the high temperature gas g is attenuated by resonance in this closed space portion 92, and the pressure distribution thereof in the circumferential direction is mitigated even further.

As described above, in the sealing apparatus for the gas turbine of the third embodiment, the first sealing portion 51, which is provided between the platform 42 of the turbine blade 28 and the inner shroud 46 of the turbine vane 27, the second sealing portion 71, which is provided more inward in the radial direction than the first sealing portion 51, and the acoustic damper 93, which has the closed space portion 92 that communicates, via the opening 91, with the disc cavity 52 between the turbine blade 28 and the turbine vane 27, are provided. The opening 91 is provided between the first sealing portion 51 and the second sealing portion 71 in the radial direction.

Therefore, by the opening 91 of the closed space portion 92 being provided between the first sealing portion 51 and the second sealing portion 71, the combustion gas G going into the disc cavity 52 from the gap between the platform 42 and the inner shroud 46 is appropriately introduced into the closed space portion 92 via the opening 91. Thus, the acoustic energy due to the pressure wave of the combustion gas G is able to be appropriately attenuated in the closed space portion 92.

Fourth Embodiment

Figure 5:
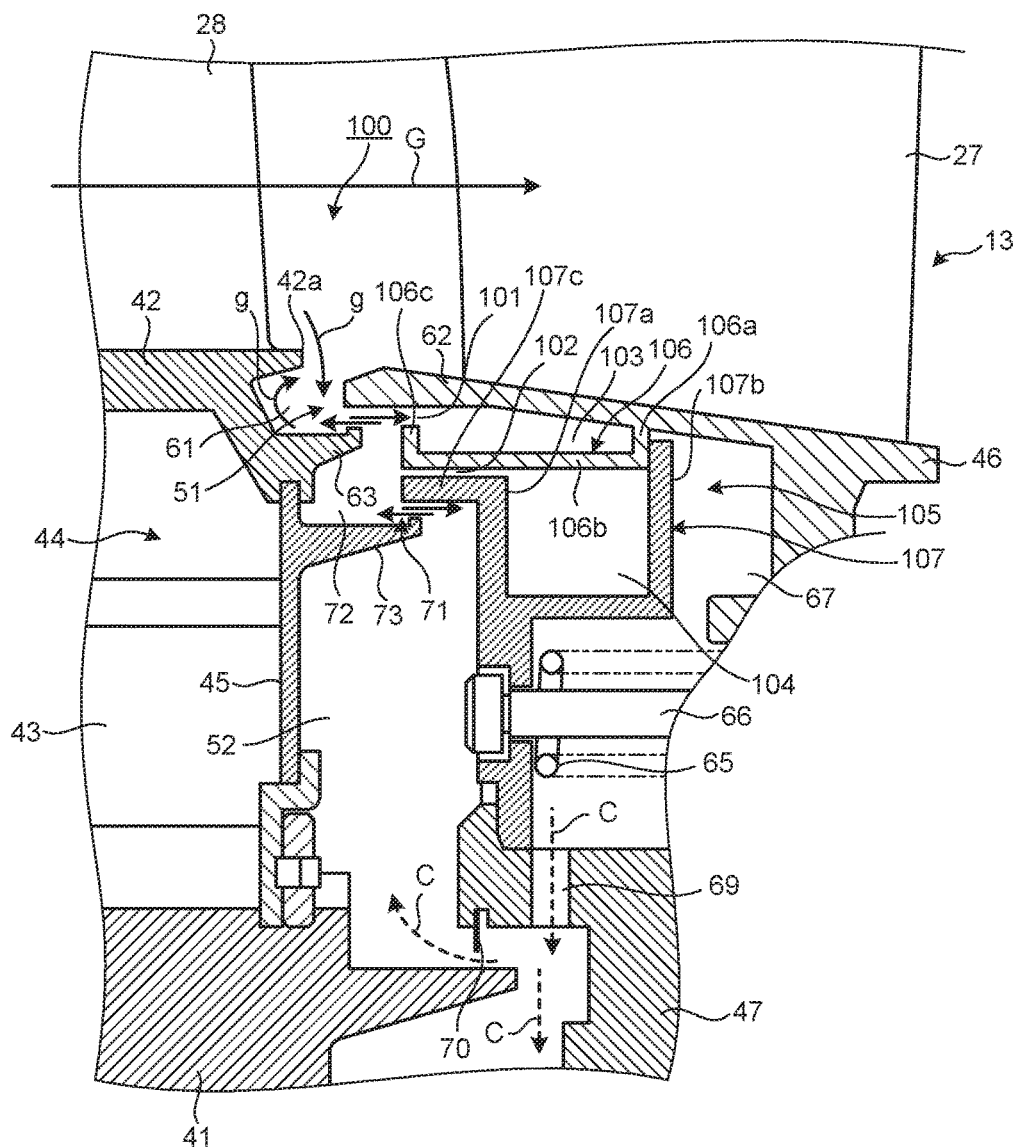
FIG. 5 is a sectional view illustrating a sealing apparatus for a gas turbine of a fourth embodiment.

FIG. 5 is a sectional view illustrating a sealing apparatus for a gas turbine of a fourth embodiment. The same signs will be appended to parts having functions that are the same as those of the above described embodiments, and detailed description thereof will be omitted.

In the fourth embodiment, as illustrated in FIG. 5, a sealing apparatus 100 includes: the first sealing portion 51 which is provided between the platform 42 of the turbine blade 28 and the inner shroud 46 of the turbine vane 27; the second sealing portion 71 which is provided more inward in the radial direction than the first sealing portion 51; and an acoustic damper 105 which has closed space portions 103 and 104 that communicate, via openings 101 and 102, with the disc cavity 52 provided between the turbine blade 28 and the turbine vane 27.

The acoustic damper 105 is arranged at an inner side of the inner shroud 46 of the turbine vane 27 in the radial direction. The sealing ring retaining ring 47 is fixed inside the inner shroud 46, and buffer plates 106 and 107 are arranged at an upstream side in the flowing direction of the high temperature gas G in the inner shroud 46 and the sealing ring retaining ring 47. The buffer plate 107 is supported by the coil spring 65 and the support shaft 66, and forms the in-vane flow channel 67 by being closely contacted with the sealing ring retaining ring 47 through biasing force. The buffer plate 106 is connected between the inner shroud 46 and the buffer plate 107.

The buffer plate 106 has a projection 106a and a plate main body 106b. The projection 106a protrudes inward from the inner surface of the inner shroud 46. The plate main body 106b extends from the projection 106a upstream in the flowing direction of the high temperature gas G, and has a distal end portion that bends outward to form a fin 106c. Therefore, the first opening 101 is formed, by the inner surface of the turbine vane rim 62 and an outer surface of the fin 106c overlapping each other with a predetermined gap therebetween in the radial direction.

Further, the buffer plate 107 has a plate main body 107a and a partition portion 107b having an L-shaped cross sectional shape. The plate main body 107a has: a lower end portion closely contacting the sealing ring retaining ring 47; an upper end portion extending to an inner surface of buffer plate 106; and a distal end portion bending and extending upstream in the flowing direction of the high temperature gas G to form a fin 107c. Therefore, the second opening 102 is formed by, an inner surface of the plate main body 106b of the buffer plate 106 and an outer surface of the fin 107c overlapping each other with a predetermined gap therebetween in the radial direction.

The first closed space portion 103 is formed by the inner shroud 46 and the buffer plate 106, and this closed space portion 103 communicates with the disc cavity 52 via the first opening 101. In this case, the first opening 101 is provided facing the first sealing portion 51 in the flowing direction (turbine axial direction) of the high temperature gas G. Further, the second closed space portion 104 is formed by the buffer plates 106 and 107, and this closed space portion 104 communicates into the disc cavity 52 via the second opening 102. In this case, the second opening 102 is provided between the first sealing portion 51 and the second sealing portion 71 in the radial direction.

A part of the high temperature gas G is diverted therefrom and rolled in toward the disc cavity 52. As this happens, the sealing apparatus 100 reduces the high temperature gas g entering into the disc cavity 52. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g tries to enter the disc cavity 52 through the first sealing portion 51. Since the first opening 101 of the acoustic damper 105 is opposite to the first sealing portion 51, a part of the high temperature gas g that has passed the first sealing portion 51 is introduced into the closed space portion 103 through the first opening 101. When the high temperature gas g and its pressure wave are introduced into the first closed space portion 103, acoustic energy due to the pressure wave of the high temperature gas g is attenuated by resonance in this first closed space portion 103, and the pressure distribution thereof in the circumferential direction is mitigated further.

Subsequently, the high temperature gas g flows into the second buffer cavity 72 through the first sealing portion 51, is agitated and mixed therein, and thereby, the pressure distribution thereof in the circumferential direction is mitigated even further. The high temperature gas g then tries to enter the disc cavity 52 through the second sealing portion 71. As this happens, since the second opening 102 of the acoustic damper 105 is positioned more outward in the radial direction than the second sealing portion 71, a part of the high temperature gas g that has passed the first sealing portion 51 is introduced into the second closed space portion 104 through the second opening 102. When the high temperature gas g and its pressure wave are introduced into the second closed space portion 104, acoustic energy due to the pressure wave of the high temperature gas g is attenuated by resonance in this second closed space portion 104, and the pressure distribution thereof in the circumferential direction is mitigated even further.

As described above, in the sealing apparatus for the gas turbine of the fourth embodiment, the first sealing portion 51, which is provided between the platform 42 of the turbine blade 28 and the inner shroud 46 of the turbine vane 27, the second sealing portion 71, which is provided more inward in the radial direction than the first sealing portion 51, and the acoustic damper 105, which has the closed space portions 103 and 104 that communicate, via the openings 101 and 102, with the disc cavity 52 between the turbine blade 28 and the turbine vane 27, are provided.

Therefore, by the providing the closed space portions 103 and 104 via the first and second openings 101 and 102 correspondingly to the first sealing portion 51 and the second sealing portion 71 that are at different positions, the pressure distribution in the circumferential direction of the combustion gas G going into the disc cavity 52 from the gap between the platform 42 and the inner shroud 46 is able to be attenuated in two steps. The combustion gas G entering into the disc cavity 52 is able to be effectively reduced with a smaller amount of purge air than conventionally done.

Lengths and amounts of gap of the openings 101 and 102, and shapes and volumes of the closed space portions 103 and 104 are set in advance, according to wave numbers of circumferential direction pressure distribution of the high temperature gas g. For example, by the length and amount of gap of the opening 101 and the shape and volume of the closed space portion 103 being set according to a wave number of a circumferential direction pressure distribution due to the turbine vane 27, and the length and amount of gap of the opening 102 and the shape and volume of the closed space portion 104 being set according to a wave number of a circumferential direction pressure distribution due to the turbine blade 28; the circumferential direction pressure distributions due to the turbine vane 27 and the turbine blade 28 are able to be effectively attenuated simultaneously.

Fifth Embodiment

Figure 6:
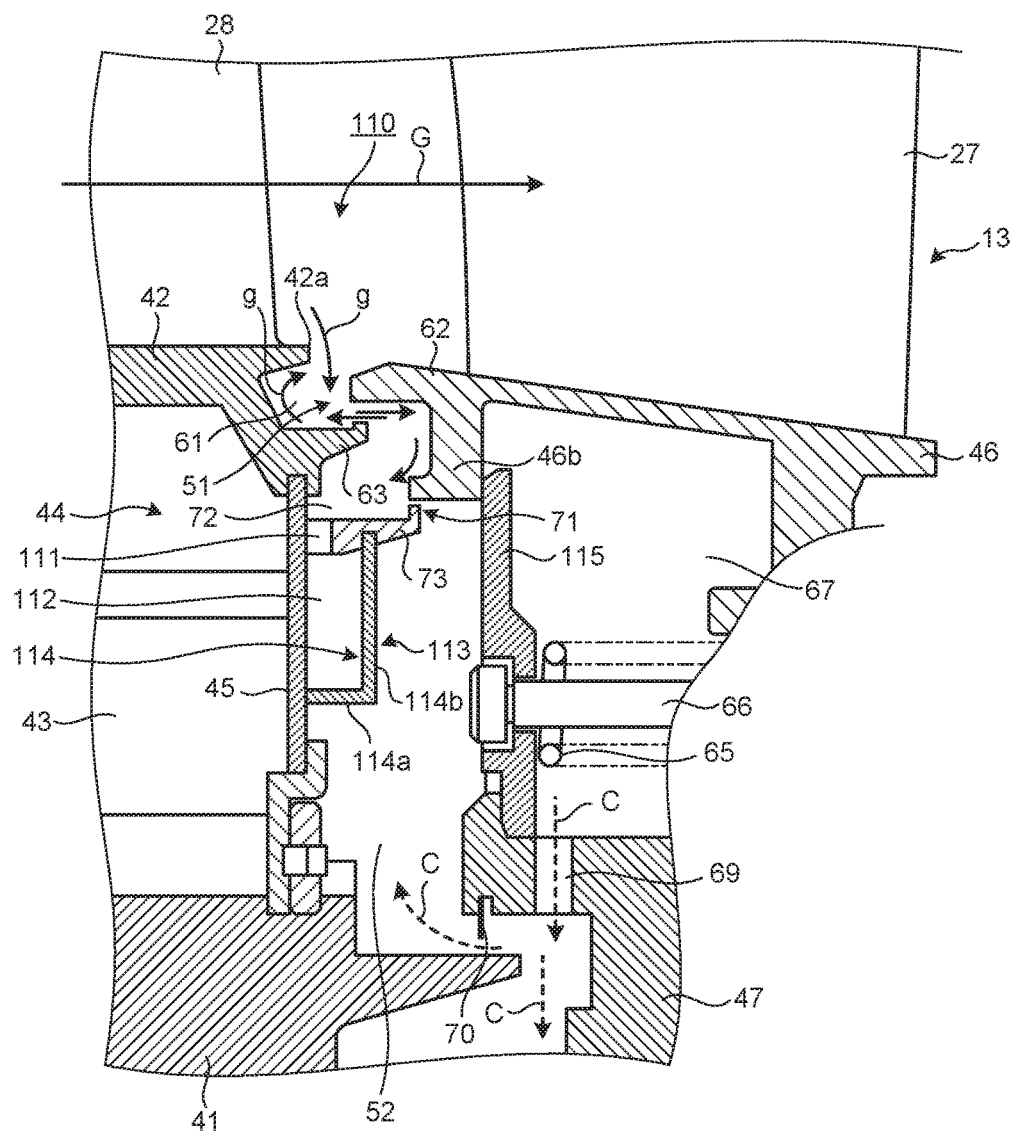
FIG. 6 is a sectional view illustrating a sealing apparatus for a gas turbine of a fifth embodiment.

FIG. 6 a sectional view illustrating a sealing apparatus for a gas turbine of a fifth embodiment. The same signs will be appended to parts having functions that are the same as those of the above described embodiments, and detailed description thereof will be omitted.

In the fifth embodiment, as illustrated in FIG. 6, a sealing apparatus 110 includes: the first sealing portion 51 which is provided between the platform 42 of the turbine blade 28 and the inner shroud 46 of the turbine vane 27; the second sealing portion 71 which is provided more inward in the radial direction than the first sealing portion 51; and an acoustic damper 113 which has a closed space portion 112 that communicates, via an opening 111, with the disc cavity 52 between the turbine blade 28 and the turbine vane 27.

The acoustic damper 113 is arranged at an inner side of the platform 42 of the turbine blade 28 in the radial direction. The turbine blade 28 has the blade root portion 43 installed in the turbine disc 41, and the space portion 44 between the respective blade root portions 43 adjacent to each other in the circumferential direction is closed by the front sealing plate 48 and the rear sealing plate 45. The second sealing fin 73 extends downstream in the flowing direction of the high temperature gas G from an inner side of the first sealing fin 63 in the rear sealing plate 45 in the radial direction. The second sealing portion 71 is formed by a protrusion 46b of the turbine vane rim 62 and the second sealing fin 73 in the flowing direction of the high temperature gas g.

A buffer plate 114 has a bottom portion 114a and a wall portion 114b. The bottom portion 114a is connected to the rear sealing plate 45, and the wall portion 114b has a lower end portion connected to the bottom portion 114a and an upper end portion connected to the second sealing fin 73. Therefore, the closed space portion 112 is formed by the buffer plate 114, the rear sealing plate 45, and the second sealing fin 73. In the second sealing fin 73, the opening 111, which connects the disc cavity 52 and the closed space portion 112 to each other, is formed.

The sealing ring retaining ring 47 is filed inside the inner shroud 16, and a buffer plate 115 is arranged at an upstream side in the flowing direction of the high temperature gas G in the inner shroud 46 and the sealing ring retaining ring 47. This buffer plate 115 is supported by the coil spring 65 and the support shaft 66, and forms the in-vane flow channel 67 by being closely contacted with the sealing ring retaining ring 47 through biasing force.

A part of the high temperature gas G is diverted therefrom and rolled in toward the disc cavity 52. As this happens, the sealing apparatus 110 reduces the high temperature gas g entering into the disc cavity 52. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g flows into the second buffer cavity 72 through the first sealing portion 51, is agitated and mixed therein, and thereby, the pressure distribution thereof in the circumferential direction is mitigated further. The high temperature gas g then tries to enter the disc cavity 52 through the second sealing portion 71. As this happens, since the opening 111 of the acoustic damper 113 is positioned at the turbine blade 28 side, a part of the high temperature gas g that has passed the first sealing portion 51 is introduced into the closed space portion 112 through the opening 111. When the high temperature gas g and its pressure wave are introduced into the closed space portion 112, acoustic energy due to this pressure wave of the high temperature gas g is attenuated by resonance in this closed space portion 112, and the pressure distribution thereof in the circumferential direction is mitigated even further.

As described above, in the sealing apparatus for the gas turbine of the fifth embodiment, the first sealing portion 51, which is provided between the platform 42 of the turbine blade 28 and the inner shroud 46 of the turbine vane 27, the second sealing portion 71, which is provided more inward in the radial direction than the first sealing portion 51, and the acoustic damper 113, which has the closed space portion 112 that communicates, via the opening 111, with the disc cavity 52 between the turbine blade 28 and the turbine vane 27, are provided. This acoustic damper 113 is arranged at the radial direction inner side of the platform 42.

Therefore, by the opening 111 of the closed space portion 112 being provided between the first sealing portion 51 and the second sealing portion 71, the combustion gas G going into the disc cavity 52 from the gap between the platform 42 and the inner shroud 46 is appropriately introduced into the closed space portion 112 via the opening 111. Thus, the acoustic energy due to the pressure wave of the combustion gas G is able to be appropriately attenuated in the closed space portion 112. In this case, since the closed space portion 112 is provided at the platform 42, which is at a movable side, the pressure wave of the combustion gas G is able to be attenuated appropriately.

As described above, in the sealing apparatus for the gas turbine of the fifth embodiment: the second sealing portion 71 is formed by extending the second sealing fin 73 more inward in the radial direction than the inner shroud 46 with a predetermined gap from the inner shroud 46, and extending the second sealing fin 73 from the rear sealing plate 45 at the platform 42 side. The closed space portion 112 is provided more inward in the radial direction than the sealing fin 73. The opening 111 is provided in the second sealing fin 73. Therefore, by the provision of the opening 111 and the closed space portion 112 by use of the second sealing fin 73, complication of the structure is able to be prevented.

Sixth Embodiment

Figure 7:
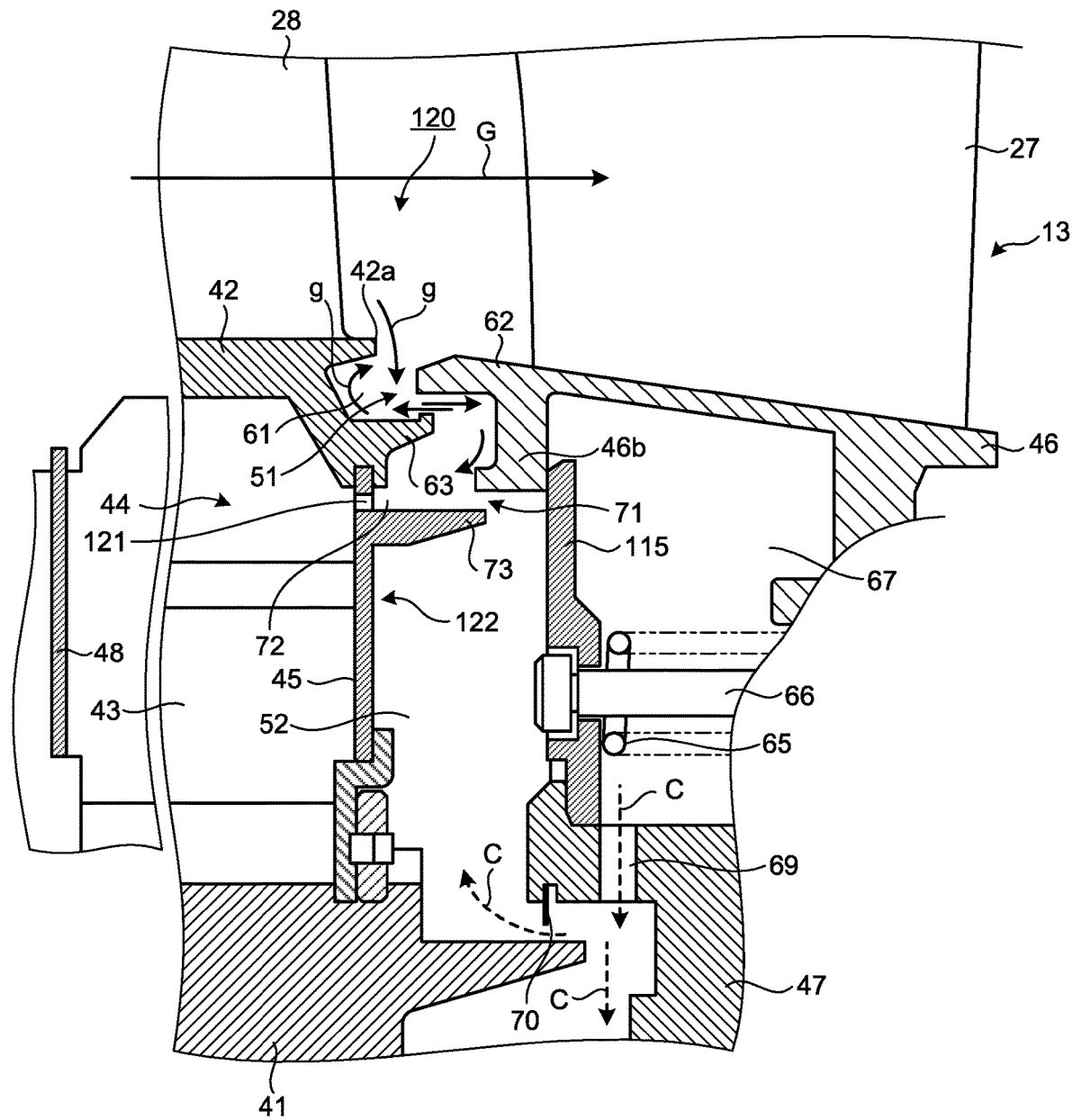
FIG. 7 is a sectional view illustrating a sealing apparatus for a gas turbine of a sixth embodiment.
Figure 8:
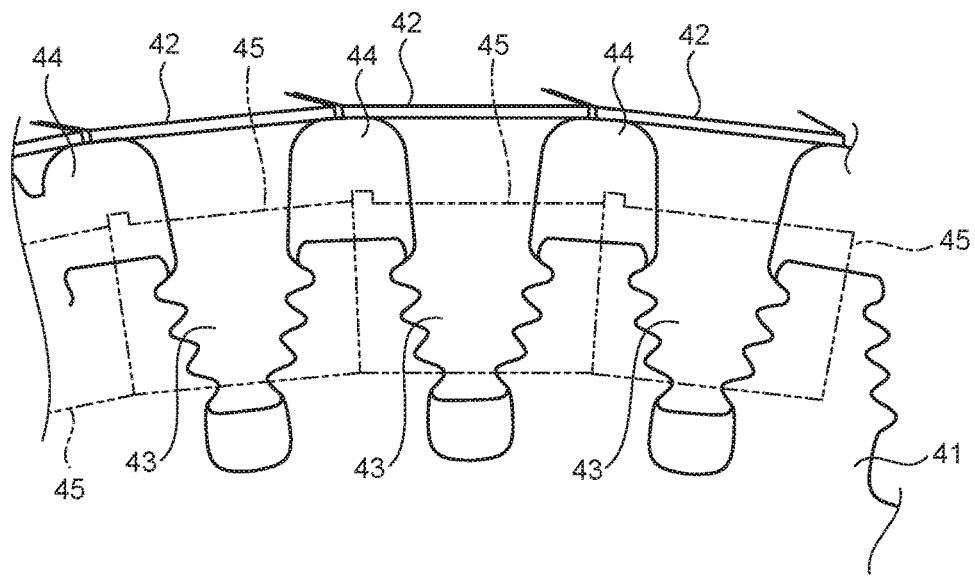
FIG. 8 is a schematic diagram illustrating a space portion of a blade root portion at a platform side.

FIG. 7 is a sectional view illustrating a sealing apparatus for a gas turbine of a sixth embodiment, and FIG. 8 is a schematic diagram illustrating a space portion of a blade root portion at a platform side. The same signs will be appended to parts having functions that are the same as those of the above described embodiments, and detailed description thereof will be omitted.

In the sixth embodiment, as illustrated in FIG. 7 and FIG. 8, a sealing apparatus 120 includes: the first sealing portion 51 which is provided between the platform 42 of the turbine blade 28 and the inner shroud 46 of the turbine vane 27; the second sealing portion 71 which is provided more inward in the radial direction than the first sealing portion 51; and an acoustic damper 122 which has the space portion (closed space portion) 44 communicating, via an opening 121, with the disc cavity 52 between the turbine blade 28 and the turbine vane 27.

The acoustic damper 122 is arranged at an inner side of the platform 42 of the turbine blade 28 in the radial direction. The turbine blade 28 has the blade root portion 43 installed in the turbine disc 41, and the space portion 44 between the respective blade root portions 43 adjacent to each other in the circumferential direction is closed by the front sealing plate 48 and the rear sealing plate 45. The second sealing fin 73 extends downstream in the flowing direction of the high temperature gas G from an inner side of the first sealing fin 63 in the rear sealing plate 45 in the radial direction. The second sealing portion 71 is formed by the protrusion 46b of the turbine vane rim 62 and the second sealing fin 73 in the flowing direction of the high temperature gas g.

The space portion 44 functions as a closed space portion of the present invention. The rear sealing plate 45 has the opening 121 formed therein, more outward in the radial direction than the second sealing fin 73, so as to connect the disc cavity 52 and the space portion 44 to each other.

A part of the high temperature gas G is diverted therefrom and rolled in toward the disc cavity 52. As this happens, the sealing apparatus 120 reduces the high temperature gas g entering into the disc cavity 52. That is, the high temperature gas g trying to enter the disc cavity 52 from the gap between the turbine blade 28 and the turbine vane 27 firstly flows into the first buffer cavity 61, and the pressure distribution thereof in the circumferential direction is mitigated by being agitated and mixed therein. Next, the high temperature gas g flows into the second buffer cavity 72 through the first sealing portion 51, is agitated and mixed therein, and thereby, the pressure distribution thereof in the circumferential direction is mitigated. The high temperature gas g then tries to enter the disc cavity 52 through the second sealing portion 71. As this happens, since the opening 121 of the acoustic damper 122 is positioned at the turbine blade 28 side, a part of the high temperature gas g that has passed the first sealing portion 51 is introduced into the space portion 44 through the opening 121. When the high temperature gas g and its pressure wave are introduced into the space portion 44, acoustic energy due to the pressure wave of the high temperature gas g is attenuated by resonance in this space portion 44, and the pressure distribution thereof in the circumferential direction is mitigated further.

As described above, in the sealing apparatus for the gas turbine of the sixth embodiment, the space portion 44 is provided by the front sealing plate 48 and the rear sealing plate 45 in the axial direction at the radial direction inner side of the platform 42, and the opening 121 is provided in the rear sealing plate 45. Therefore, by formation of the acoustic damper 122 by utilization of the existing space portion 44, complication of the structure and increase in cost are able to be prevented.

Seventh Embodiment

Figure 9:
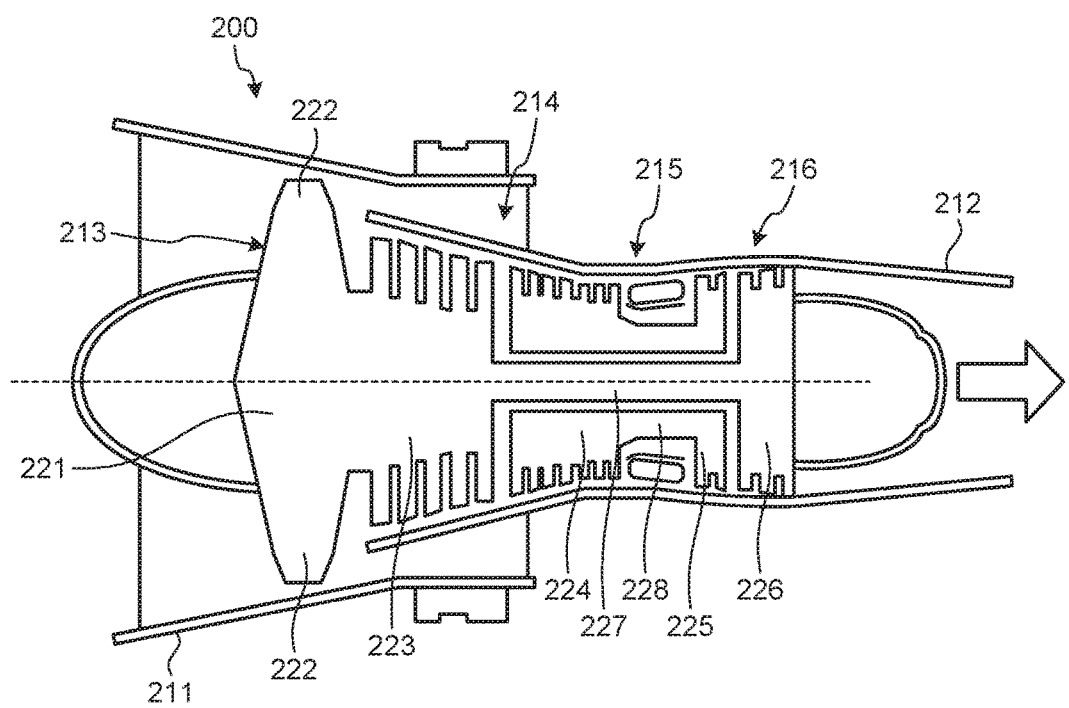
FIG. 9 is a schematic diagram illustrating an overall configuration of an aircraft engine.

FIG. 9 is a schematic diagram illustrating an overall configuration of an aircraft engine.

In a seventh embodiment, as illustrated in FIG. 9, an aircraft engine 200 is a gas turbine, has a fan casing 211 and a main body casing 212, and is formed by: a fan 213 being accommodated in the fan casing 211; and a compressor 214, a combustor 215, and a turbine 216 being accommodated in the main body casing 212.

The fan 213 is formed by plural fan blades 222 being installed in an outer peripheral portion of a rotating shaft 221. The compressor 214 has a low pressure compressor 223 and a high pressure compressor 224. The combustor 215 is arranged downstream in a flowing direction of compressed air from the compressor 214, and plural combustors 214 are arranged in the circumferential direction. The turbine 216 is arranged downstream in a flowing direction of combustion gas from the combustor 215, and has a high pressure turbine 225 and a low pressure turbine 226. The rotating shaft 221 of the fan 213 is connected to the low pressure compressor 223, and the low pressure compressor 223 and the low pressure turbine 226 are connected to each other by a first rotor shaft 227. Further, the high pressure compressor 224 and the high pressure turbine 225 are connected to each other by a second rotor shaft 228, which is positioned on an outer peripheral side of the first rotor shaft 227 and is cylindrically shaped.

Therefore, the compressor 214 generates high temperature and high pressure compressed air, by air taken in from an air intake port thereof being pressured out by the air passing through non-illustrated plural compressor vanes and compressor blades in the low pressure compressor 223 and high pressure compressor 224. By supplying a predetermined fuel to this compressed air to cause combustion, the combustor 215 generates high temperature and high pressure combustion gas. The turbine 216 is driven to rotate by the combustion gas generated by the combustor 215 passing through non-illustrated turbine vanes and turbine blades in the high pressure turbine 225 and low pressure turbine 226. In this case, the driving is caused by rotating force of the low pressure turbine 226 being transmitted to the low pressure compressor 223 by the first rotor shaft 227. Further, the driving is caused by rotating force of the high pressure turbine 225 being transmitted to the high pressure compressor 224 by the second rotor shaft 228. As a result, the fan 213 is able to be driven, and thrust is able to be obtained by exhaust gas discharged from the turbine 216.

In this aircraft engine 200, a first sealing portion which is provided between a platform of a turbine blade and an inner shroud of a turbine vane of the turbine 216, and the acoustic damper 55 which has a closed space portion that communicates, via an opening, with a disc cavity provided between the turbine blade and the turbine vane are provided. Therefore, even in the aircraft engine 200, the efficiency of the gas turbine is able to be improved by reduction of entrance of the combustion gas into the turbine body being enabled with a small amount of purge air.

REFERENCE SIGNS LIST

11 COMPRESSOR
12 COMBUSTOR
13 TURBINE
14 CASING
20 AIR INTAKE PORT
21 COMPRESSOR CASING
22 INLET GUIDE VANE
23 COMPRESSOR VANE
24 COMPRESSOR BLADE
25 BLEED AIR CHAMBER
26 TURBINE CASING
27 TURBINE VANE
28 TURBINE BLADE
29 EXHAUST CASING
30 EXHAUST CHAMBER
31 EXHAUST DIFFUSER
32 ROTOR (ROTATING SHAFT)
33, 34 BEARING
35, 36, 37 LEG PORTION
41 TURBINE DISC
42 PLATFORM
43 BLADE ROOT PORTION
44 SPACE PORTION
45 REAR SEALING PLATE
46 INNER SHROUD
47 SEALING RING RETAINING RING
50, 80, 90, 100, 110, 120 SEALING APPARATUS
51 FIRST SEALING PORTION
52 DISC CAVITY
53, 81, 91, 101, 102, 111, 121 OPENING
54, 82, 92, 103, 104, 112 CLOSED SPACE PORTION
55, 83, 93, 105, 113, 122 ACOUSTIC DAMPER
61 FIRST BUFFER CAVITY
62 TURBINE VANE RIM
63 FIRST SEALING FIN
64, 84, 94, 106, 107, 114, 115 BUFFER PLATE
65 COIL SPRING
66 SUPPORT SHAFT
67 IN-VANE FLOW CHANNEL
68 PARTITION PLATE
69 SEALING AIR SUPPLY HOLE
71 SECOND SEALING PORTION
72 SECOND BUFFER CAVITY
73 SECOND SEALING FIN
200 AIRCRAFT ENGINE
214 COMPRESSOR
215 COMBUSTOR
216 TURBINE
G, g HIGH TEMPERATURE GAS (COMBUSTION GAS)

The invention claimed is:

1. A sealing apparatus for a gas turbine, the sealing apparatus comprising:
a sealing portion positioned between a platform of a turbine blade and an inner shroud of a turbine vane; and
an acoustic damper that has a closed space portion to communicate, via an opening, with a disc cavity positioned between the turbine blade and the to vane, wherein:
the closed space portion is at least partially defined by a buffer plate; the buffer plate has
a plate main body at least partially extending in a radial direction and a partition portion at least partially extending parallel to the plate main body;
the plate main body defines an upstream side of the closed space portion;
the partition portion defines a downstream side of the closed space portion;
the plate main body contacts a sealing ring retaining ring of the inner shroud of the turbine vane; and
the partition portion contacts a projection protruding inward in the radial direction from an inner surface of the inner shroud of the turbine vane.

2. The sealing apparatus according to claim 1, wherein: the sealing portion has a first sealing portion defined by the platform of the turbine blade being more inward in the radial direction than the inner shroud of the turbine vane with a gap from the inner shroud of the turbine vane; and the opening faces the first sealing portion in a turbine axial direction.

3. The sealing apparatus according to claim 1, wherein the sealing portion has: a first sealing portion defined by the platform of the turbine blade being more inward in the radial direction than the inner shroud of the turbine vane with a gap from the inner shroud of the turbine vane; and a second sealing portion which is more inward in the radial direction than the first sealing portion, and wherein the opening is defined at an outer side of the second sealing portion in the radial direction.

4. The sealing apparatus according to claim 1, wherein the sealing portion has: a first sealing portion defined by the platform of the turbine blade being more inward in the radial direction than the inner shroud of the turbine vane with a gap from the inner shroud of the turbine vane and a second sealing portion which is more inward in the radial direction than the first sealing portion, and wherein the opening is defined between the first sealing portion and the second sealing portion in the radial direction.

5. The sealing apparatus according to claim 1, wherein the sealing portion has: a first sealing portion defined by the platform of the turbine blade being more inward in the radial direction than the inner shroud of the turbine vane with a gap from the inner shroud of the turbine vane; and a second sealing portion which is more inward in the radial direction than the first sealing portion, and wherein the opening has: a first opening that faces the first sealing portion in a turbine axial direction; and a second opening defined at an outer side of the second sealing portion in the radial direction.

6. The sealing apparatus according to claim 5, wherein the closed space portion has:
a first closed space portion; and
a second closed space portion,
wherein:
the second closed space portion is more inward in the radial direction than the first closed space portion;
the first opening is defined in the first closed space portion; and
the second opening is defined in the second closed space portion.

7. A sealing apparatus for a gas turbine, the sealing apparatus comprising:
a sealing portion positioned between a platform of a turbine blade and an inner shroud of a turbine vane; and
an acoustic damper that has a closed space portion to communicate, via an opening, with a disc cavity positioned between the turbine blade and the turbine vane, wherein:
the closed space portion is positioned at an inner side of the platform of the turbine blade in a radial direction, the closed space portion is defined by a sealing plate, a buffer plate, and a sealing fin;
the sealing fin extends from the sealing plate;
a first end of the buffer plate adjoins the sealing plate;
a second end of the buffer plate adjoins the sealing fin; and
the opening is defined in the sealing fin.

8. The sealing apparatus according to claim 7, wherein the sealing fin extends more inward in the radial direction than the inner shroud of the turbine vane with a gap from the inner shroud of the turbine vane, the sealing fin extends from a platform side, and the closed space portion is more inward in the radial direction than the sealing fin.

9. A sealing apparatus for a gas turbine, the sealing apparatus comprising:
a sealing portion positioned between a platform of a turbine blade and an inner shroud of a turbine vane; and
an acoustic damper that has a closed space portion to communicate, via an opening, with a disc cavity positioned between the turbine blade and the turbine vane, wherein:
the closed space portion is at least partially defined by a front sealing plate and a rear sealing plate in an axial direction and is positioned at an inner side of the platform of the turbine blade in a radial direction;
the rear sealing plate extends in the radial direction,
a first end of the rear sealing plate adjoins the platform of the turbine blade and a second end of the rear sealing plate is mechanically coupled to a turbine disc;
a sealing fin extends from the rear sealing plate downstream in the axial direction;
and the opening is defined in the rear sealing plate and is outward in the radial direction from the sealing fin.

10. The sealing apparatus according to claim 1, wherein the closed space portion is defined along a circumferential direction.

11. The sealing apparatus for the gas turbine according to claim 10, wherein the closed space portion is plurally divided in the circumferential direction by a partition plate.

12. A gas turbine having a compressor, a combustor, and a turbine, wherein
the sealing apparatus according to claim 1 is in the turbine.

13. An aircraft engine having a compressor, a combustor, and a turbine, wherein
the sealing apparatus according to claim 1 is in the turbine.

* * * * *